United States Patent
Wakita et al.

(10) Patent No.: US 9,225,021 B2
(45) Date of Patent: *Dec. 29, 2015

(54) NONAQUEOUS ELECTROLYTE SECONDARY BATTERY

(75) Inventors: Shinya Wakita, Fukushima (JP); Masayuki Ihara, Fukushima (JP); Izaya Okae, Fukushima (JP)

(73) Assignee: SONY CORPORATION, Tokyo (JP)

( * ) Notice: Subject to any disclaimer, the term of this patent is extended or adjusted under 35 U.S.C. 154(b) by 1103 days.

This patent is subject to a terminal disclaimer.

(21) Appl. No.: 12/689,700

(22) Filed: Jan. 19, 2010

(65) Prior Publication Data

US 2010/0196756 A1 Aug. 5, 2010

(30) Foreign Application Priority Data

Jan. 30, 2009 (JP) ................ P2009-020454

(51) Int. Cl.
*H01M 4/58* (2010.01)
*H01M 4/583* (2010.01)
*H01M 4/36* (2006.01)
*H01M 10/0525* (2010.01)
*H01M 10/0567* (2010.01)
*H01M 4/02* (2006.01)

(52) U.S. Cl.
CPC ............ *H01M 4/5825* (2013.01); *H01M 4/366* (2013.01); *H01M 4/583* (2013.01); *H01M 10/0525* (2013.01); *H01M 10/0567* (2013.01); *H01M 2004/027* (2013.01); *H01M 2004/028* (2013.01); *Y02E 60/122* (2013.01)

(58) Field of Classification Search
CPC ... H01M 4/5825; H01M 4/583; H01M 4/366; H01M 10/0567; H01M 10/0525; H01M 2004/028; H01M 2004/027; Y02E 60/122
USPC ......... 429/340, 341, 199, 200, 336, 327, 329, 429/221, 231.1, 231.8
See application file for complete search history.

(56) References Cited

FOREIGN PATENT DOCUMENTS

| JP | 2002-134170 | 5/2002 |
|---|---|---|
| JP | 2003-157843 | 5/2003 |
| JP | 2004-022336 | 1/2004 |
| JP | 2004-22336 | 1/2004 |
| JP | 2004-047180 | 2/2004 |
| JP | 2006-156315 | 6/2006 |
| JP | 2008-098053 | 4/2008 |
| JP | 2008-147117 | 6/2008 |
| JP | 2008-147119 | 6/2008 |
| JP | 2008-218298 | 9/2008 |
| WO | 2008/105490 | 9/2008 |

OTHER PUBLICATIONS

Japanese Office Action dated Jun. 21, 2011 for corresponding Application No. 2009-020454.
Japanese Office Action issued on Apr. 10, 2012 corresponding to Japanese Appln. No. 2009-020454.

*Primary Examiner* — Laura Weiner
(74) *Attorney, Agent, or Firm* — Hazuki International, LLC

(57) ABSTRACT

A nonaqueous electrolyte secondary battery includes: a positive electrode; a negative electrode; and a nonaqueous electrolyte, wherein the positive electrode contains a positive electrode active material having an olivine structure, and the nonaqueous electrolyte contains at least one member of sulfone compounds represented by the following formulae (1) and (2).

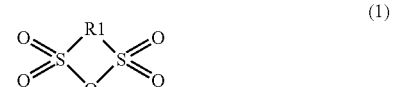

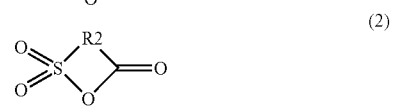

wherein R1 represents $C_mH_{2m-n1}X_{n2}$; X represents a halogen; m represents an integer of from 2 to 7; each of n1 and n2 independently represents an integer of from 0 to 2m; R2 represents $C_jH_{2j-k1}Z_{k2}$; Z represents a halogen; j represents an integer of from 2 to 7; and each of k1 and k2 independently represents an integer of from 0 to 2j.

4 Claims, 2 Drawing Sheets

NONAQUEOUS ELECTROLYTE SECONDARY BATTERY

CROSS REFERENCES TO RELATED APPLICATIONS

The present application claims priority to Japanese Priority Patent Application JP 2009-020454 filed in the Japan Patent Office on Jan. 30, 2009, the entire contents of which is hereby incorporated by reference.

BACKGROUND

The present application relates to a nonaqueous electrolyte secondary battery.

Among nonaqueous electrolyte batteries, a lithium ion secondary battery is rapidly developing as a power source of portable electronic appliances such as a mobile phone and a portable personal computer. In the power source for such a portable electronic appliance, an energy density, namely an energy storage capacity per unit volume is the most necessary characteristic, and how long the portable electronic appliance can be used attracts interest. In recent years, a lithium iron phosphate compound (LiFePO$_4$) having an olivine structure is watched from the viewpoint of safety.

JP-A-2004-22336 discloses that a lithium secondary battery having not only excellent characteristics in energy density, electromotive force and the like but excellent cycle life and safety is obtained using an electrolytic solution containing a sulfonic acid anhydride in an aprotic organic solvent.

JP-A-2002-134170 discloses that in a nonaqueous electrolytic solution secondary battery using a cobalt-containing positive electrode active material, by adding a compound capable of forming a complex with cobalt to an electrolytic solution to stabilize a cobalt ion eluted in the electrolytic solution and to suppress deposition thereof on a negative electrode, thereby reducing a reaction area of the negative electrode and suppressing the generation of a gas due to a catalytic reaction of cobalt, a nonaqueous electrolytic solution secondary battery which is excellent in high-temperature storage characteristic and high-temperature charge and discharge cycle characteristic can be provided.

However, for example, when a portable personal computer is allowed to stand in a continuously connected state to a power source, the battery within a battery pack is exposed in a charged state, and the battery capacity is abruptly deteriorated. This is caused due to the fact that iron contained in the positive electrode active material is easily eluted in an oxidizing atmosphere, or the film growth on the surface of the positive electrode active material in a charging atmosphere is promoted, whereby the interfacial resistance increases, and at the same time, the capacity is lowered by a change in the layered structure. Furthermore, an increase in the circumferential temperature following drive of the portable personal computer is a factor in acceleration of the deterioration.

As reform measures, for example, JP-A-2002-134170 discloses a technology in which even when Co is eluted from a lithium cobalt complex oxide, it is stabilized by an additive of the electrolytic solution, thereby avoiding an adverse influence against the negative electrode. A phenomenon of elution of a metal ion from not only the lithium cobalt complex oxide but an iron olivine phosphate or the like is common as a basic mechanism. However, though the adverse influence against the negative electrode to be caused due to the elution of Fe can be avoided, the positive electrode resistance increases by a change in the positive electrode structure, and the capacity is deteriorated. Namely, a battery with high reliability is not obtainable unless the elution of Fe itself is suppressed.

That is, a nonaqueous electrolyte secondary battery which is further excellent in a floating characteristic is desirable.

SUMMARY

It is desirable to provide a nonaqueous electrolyte secondary battery which is excellent in a floating characteristic.

According to an embodiment of the present application, there is provided a nonaqueous electrolyte secondary battery including a positive electrode, a negative electrode and a nonaqueous electrolyte, wherein
the positive electrode contains a positive electrode active material having an olivine structure; and
the nonaqueous electrolyte contains at least one member of sulfone compounds represented by the following formulae (1) and (2).

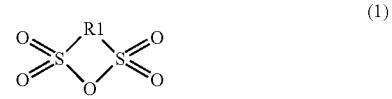

In the foregoing formulae (1) and (2), R1 represents $C_mH_{2m-n1}X_{n2}$; X represents a halogen; m represents an integer of from 2 to 7; each of n1 and n2 independently represents an integer of from 0 to 2m; R2 represents $C_jH_{2j-k1}Z_{k2}$; Z represents a halogen; j represents an integer of from 2 to 7; and each of k1 and k2 independently represents an integer of from 0 to 2j.

The term "nonaqueous electrolyte" as referred to in the specification of this application includes a nonaqueous electrolyte in a liquid form and a nonaqueous electrolyte in a gel form.

According to the embodiment of the present application, in view of the fact that the nonaqueous electrolyte contains the foregoing sulfone compound, a favorable protective film is formed on the surface of the positive electrode active material at the initial charge so that even when exposed in a charging atmosphere, not only the elution of iron can be suppressed, but its reactivity with an electrolytic solution can be suppressed. Therefore, the excessive film growth of can be suppressed. According to this, it is possible to obtain a lithium ion secondary battery which is low in deterioration.

Additional features and advantages are described herein, and will be apparent from the following Detailed Description and the figures.

DETAILED DESCRIPTION

Figure 1:
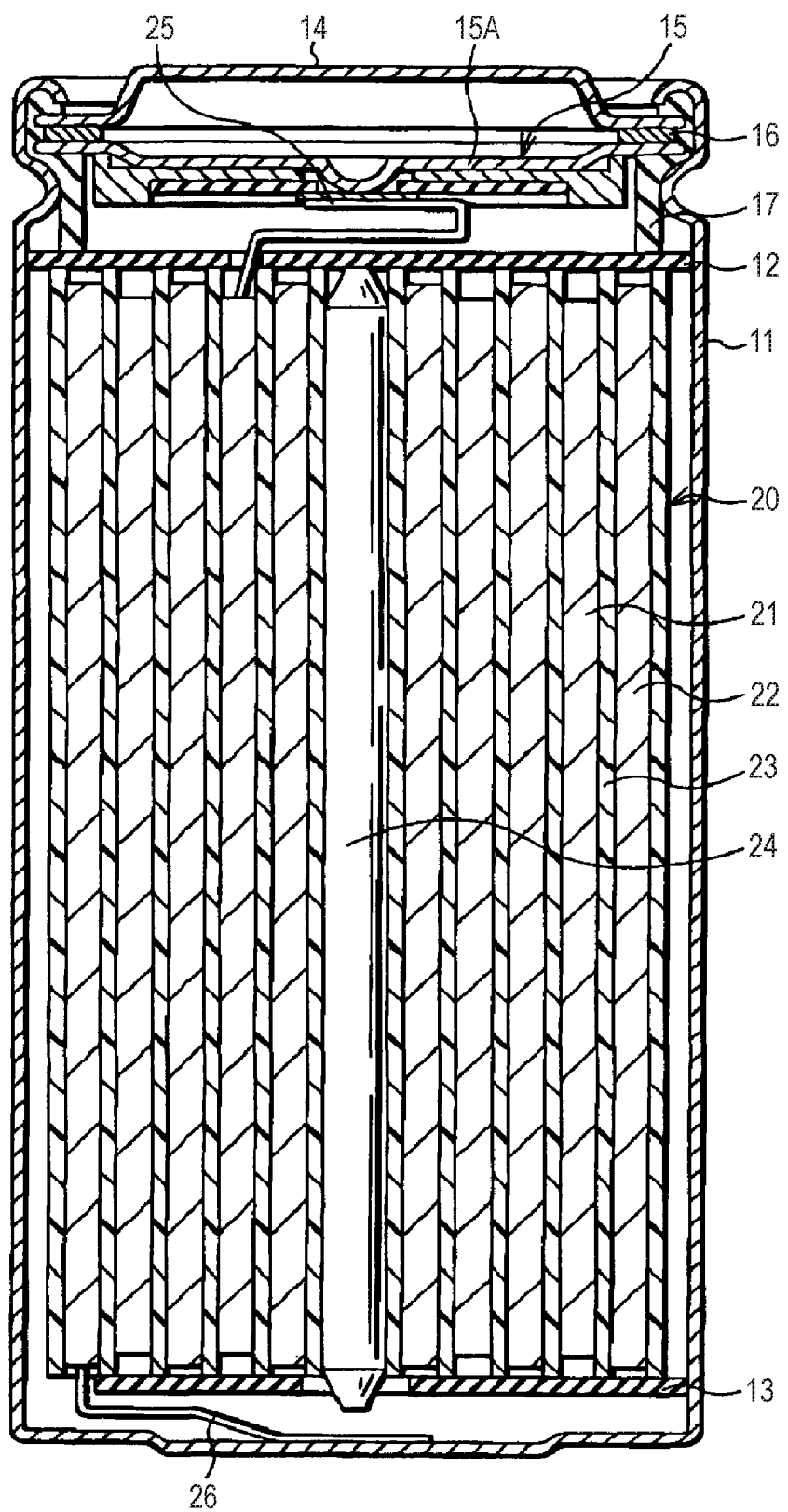
FIG. 1 is a sectional view showing the configuration of a secondary battery according to an embodiment of the present application.

Embodiments of the present application are hereunder described in detail. In the specification of this application, the term "%" means % by mass unless otherwise indicated.

In an embodiment according to the present application, a positive electrode contains a positive electrode active material having an olivine structure. The positive electrode active material having an olivine structure is preferably a lithium iron phosphate compound (LiFePO$_4$) or an exotic atom-containing lithium iron complex phosphate compound (LiFe$_x$M$_{1-x}$PO$_4$, wherein M represents a metal of one or more kinds; and x is satisfied with the relationship of (0<x<1)). The positive electrode active material layer is preferably composed mainly of a lithium iron phosphate compound or a lithium iron complex phosphate compound. It is meant by the term "mainly" as referred to herein that the amount of the lithium iron phosphate compound or lithium iron complex phosphate compound is 50% or more of the total mass of the positive electrode active material of the positive electrode active material layer. Also, in the case where M is a metal of two or more kinds, M is selected such that the total sum of respective subscripts is (1−x). Examples of M include a transition element, an element belonging to the Group IIA, an element belonging to the Group IIIA, an element belonging to the Group IIIB and an electrode belonging to the Group IVB. In particular, M is preferably a metal containing, as a transition metal element, at least one member selected from the group consisting of cobalt (Co), nickel, manganese (Mn), iron, aluminum, vanadium (V) and titanium (Ti).

The positive electrode active material may also be a lithium iron phosphate compound or a lithium iron complex phosphate compound, onto the surface of which is applied a coating layer containing a metal oxide (for example, those containing a metal selected from Ni, Mn, Li and the like) or a phosphate compound (for example, lithium phosphate, etc.) each having a different composition from the instant oxide.

In the embodiment according to the present application, the positive electrode active material means a positive electrode active material capable of intercalating and deintercalating lithium as an electrode reactant.

In the embodiment according to the present application, the negative electrode preferably contains a carbon based material. Also, the negative electrode active material layer is preferably composed mainly of a carbon based material as a negative electrode active material. It is meant by the term "mainly" as referred to herein that the amount of the carbon based material is 50% or more of the total mass of the negative electrode active material of the negative electrode active material layer. The term "carbon based material" as referred to herein means a material containing 90% by mass or more of carbon. Examples of the carbon based material include graphite, hardly graphitized carbon and easily graphitized carbon. Such a carbon based material is preferable because a change in the crystal structure to be generated at the time of charge and discharge is very little, a high charge and discharge capacity can be obtained, and a favorable charge and discharge cycle characteristic can be obtained. The graphite may be either natural graphite or artificial graphite.

As the hardly graphitized carbon, one which has a lattice spacing of the (002) plane of 0.37 nm or more and a true density of less than 1.70 g/cm$^3$ and which does not show an exothermic peak at 700° C. or higher in differential thermal analysis (DTA) in air is preferable.

Next, the nonaqueous electrolyte is described.

The nonaqueous electrolyte contains at least one member of sulfone compounds represented by the foregoing formulae (1) and (2). That is, the nonaqueous electrolyte may be one containing only a sulfone compound represented by the formula (1) or one containing only a sulfone compound represented by the formula (2) or one containing both of them. In each of the cases, one or more kinds can be used on the structural basis. The sulfone compound represented by the formula (1) is also referred to as "sulfone compound (1)". The same is applicable to the formula (2) or the like. Furthermore, in the case where the both are contained, the compounds are also referred to merely as "sulfone compound". The content of the sulfone compound in the nonaqueous electrolyte is preferably from 0.01 to 1.0% by mass relative to the nonaqueous electrolyte (here, the sulfone compound is not included in the nonaqueous electrolyte). This is because when the content of the sulfone compound exceeds 1.0% by mass, the positive electrode film becomes thick, and the film resistance becomes excessively large. When the content of the sulfone compound is less than 0.01% by mass, it may be impossible to achieve the desired effects.

The sulfone compound (1) is hereunder described.

R1 represents C$_m$H$_{2m-n1}$X$_{n2}$; m represents an integer of from 2 to 7, and preferably an integer of from 2 to 3; each of n1 and n2 independently represents an integer of from 0 to 2m, and preferably an integer of from 4 to 6; and X represents a halogen, and preferably fluorine or chlorine. R1 may be linear, branched or cyclic and may be unsaturated or saturated; and R1 is preferably saturated and linear.

Specific examples of the sulfone compound (1) are given below, but it should not be construed that the embodiment according to the present application is limited thereto.

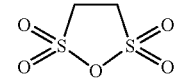

(1)

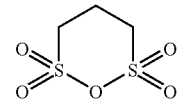

(2)

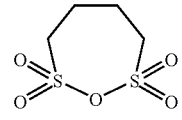

(3)

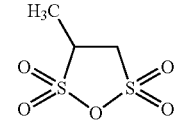

(4)

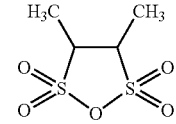

(5)

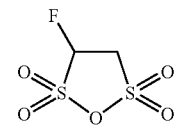

(6)

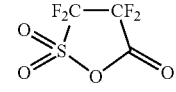

(7)

-continued (8) 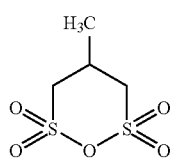

(9) 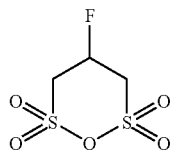

(10) 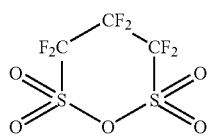

(11) 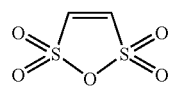

(12) 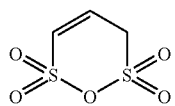

(13) 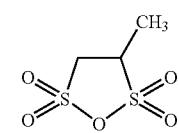

(14) 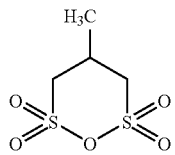

(15) 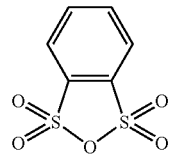

(16) 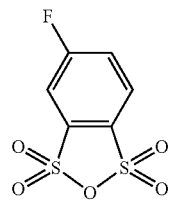

(17) 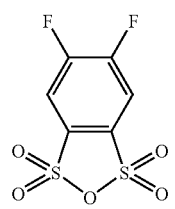

-continued

(18) 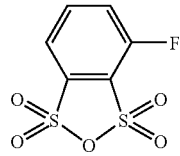

(19) 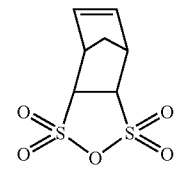

The sulfone compound (1) is especially preferably a compound represented by the following formula (1-1).

(1-1) 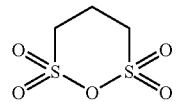

The sulfone compound (2) is hereunder described.

R2 represents $C_jH_{2j-k1}Z_{k2}$; j represents an integer of from 2 to 7, and preferably an integer of from 2 to 3; and each of k1 and k2 independently represents an integer of from 0 to 2j, and an integer of from 4 to 6. Z represents a halogen, and preferably fluorine or chlorine. R2 may be linear, branched or cyclic and may be unsaturated or saturated; and R2 is preferably saturated and linear.

Specific examples of the sulfone compound (2) are given below, but it should not be construed that the embodiment according to the present application is limited thereto.

(1) 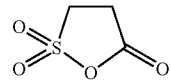

(2) 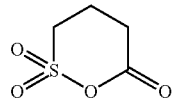

(3) 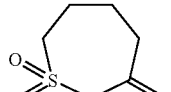

(4) 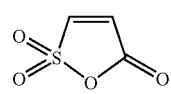

(5) 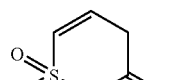

(6) 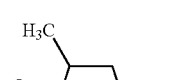

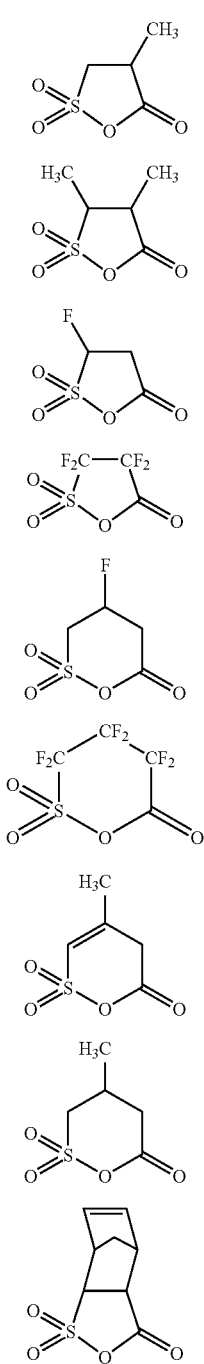

The nonaqueous electrolyte contains a solvent and an electrolyte salt. Examples of the solvent include ambient temperature molten salts such as 4-fluoro-1,3-dioxolan-2-one (FEC), ethylene carbonate, propylene carbonate, butylene carbonate, vinylene carbonate (VC), dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, ethyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, nitromethane, nitroethane, sulfolane, dimethyl sulfoxide, trimethyl phosphate, triethyl phosphate, ethylene sulfide and bistrifluoromethylsulfonylimidotrimethylhexyl ammonium. Above all, the use of a mixture with at least one member selected from the group consisting of 4-fluoro-1,3-dioxolan-2-one, ethylene carbonate, propylene carbonate, vinylene carbonate, dimethyl carbonate, ethyl methyl carbonate and ethylene sulfide is preferable because excellent charge and discharge capacity characteristic and charge and discharge cycle characteristic can be obtained.

As to the electrolyte salt which is contained in the nonaqueous electrolyte, a single kind material or a mixture of two or more kinds of materials may be contained. Examples of the electrolyte salt include lithium electrolyte salts such as lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), tris(trifluoromethanesulfonyl)methyl lithium ($LiC(SO_2CF_3)_3$), lithium chloride (LiCl) and lithium bromide (LiBr).

Embodiments of the present application are hereunder described in detail with reference to the accompanying drawings.

FIG. 1 shows a sectional structure of a secondary battery according to an embodiment of the present application. This secondary battery is of a so-called cylinder type and has a wound electrode body 20 in which strip-shaped positive electrode 21 and negative electrode 22 are wound via a separator 23 in the inside of a battery can 11 in a substantially hollow column shape. The battery can 11 is constituted of, for example, iron (Fe) plated with nickel (Ni). One end of the battery can 11 is closed, with the other end being opened. A pair of insulating plates 12 and 13 is respectively disposed perpendicular to the winding peripheral face in the inside of the battery can 11 so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is constituted of, for example, a material the same as that in the battery can 11. The safety valve mechanism 15 is electrically connected to the battery lid 14 via the positive temperature coefficient device 16. In the case where the pressure in the inside of the battery reaches a fixed value or more due to an internal short circuit or heating from the outside or the like, a disc plate 15A is reversed, whereby electrical connection between the battery lid 14 and the wound electrode body 20 is disconnected. When the temperature increases, the positive temperature coefficient device 16 controls the current due to an increase of a resistance value, thereby preventing abnormal heat generation to be caused due to a large current. The gasket 17 is constituted of, for example, an insulating material, and asphalt is coated on the surface thereof.

For example, a center pin 24 is inserted on the center of the wound electrode body 20. In the wound electrode body 20, a positive electrode lead 25 made of aluminum (Al) or the like is connected to the positive electrode 21; and a negative electrode lead 26 made of nickel or the like is connected to the negative electrode 22. The positive electrode lead 25 is electrically connected to the battery lid 14 by means of welding with the safety valve mechanism 15; and the negative electrode lead 26 is electrically connected to the battery can 11 by means of welding.

Figure 2:
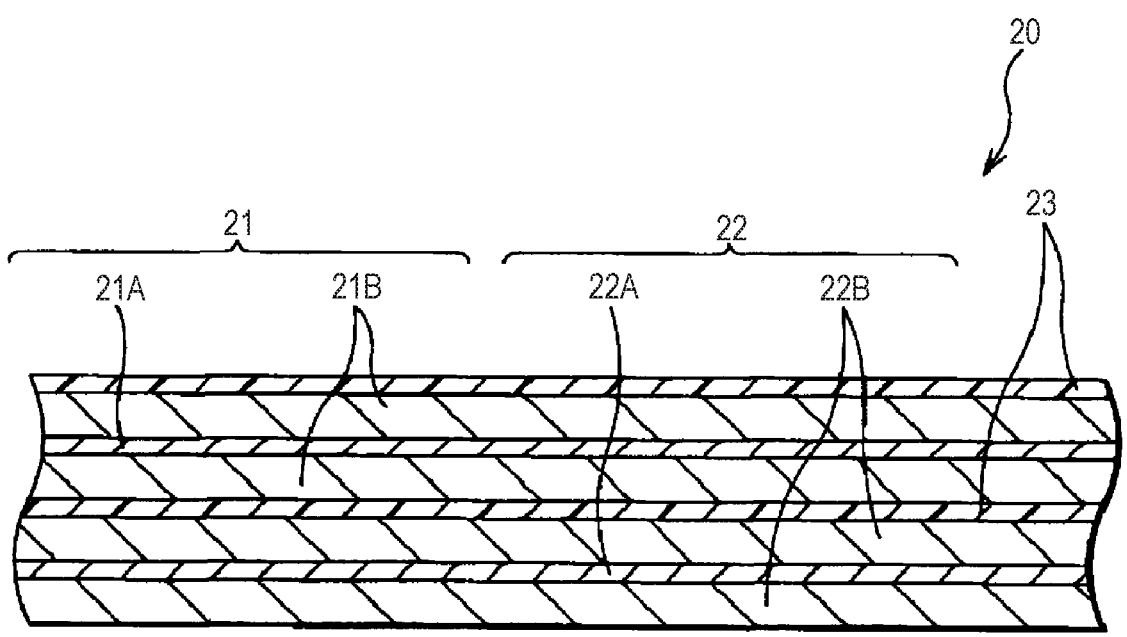
FIG. 2 is a sectional view showing enlargedly a part of a wound electrode body in the secondary battery shown in FIG. 1.

FIG. 2 shows enlargedly a part of the wound electrode body 20 shown in FIG. 1.

The positive electrode 21 has, for example, a configuration in which a positive electrode active material layer 21B is provided on the both surfaces of a positive electrode collector 21A having a pair of surfaces opposing to each other. While illustration is omitted, the positive electrode active material layer 21B may be provided on only one surface of the positive electrode collector 21A. The positive electrode collector 21A is constituted of a metal foil, for example, an aluminum foil, a nickel foil, a stainless steel foil, etc.

Though it is essential that the positive electrode active material layer 21B contains a positive electrode active material having an olivine structure as the positive electrode active material, in addition to this, the positive electrode active material layer 21B may contain a positive electrode material capable of intercalating and deintercalating lithium as an electrode reactant. Also, if desired, the positive electrode active material layer 21B may contain a conductive agent. Though it is preferable that the positive electrode active material layer 21B contains, for example, polyvinylidene fluoride as a binder, it may further contain polyacrylonitrile, a rubber based binder or the like. The polyvinylidene fluoride may be, for example, a PVDF-CTFE copolymer (vinylidene fluoride-chlorotrifluoroethylene copolymer), a PVDF-PTFE copolymer (vinylidene fluoride-polytrifluoroethylene copolymer), a polyvinylidene fluoride maleic acid modified material or the like.

Examples of the positive electrode material capable of intercalating and deintercalating lithium include lithium-containing compounds such as a lithium oxide, a lithium sulfide, an intercalation compound containing lithium and a lithium phosphate compound. Of these, a complex oxide containing lithium and a transition metal element or a phosphate compound containing lithium and a transition metal element is preferable; and a compound containing at least one member selected from the group consisting of cobalt (Co), nickel, manganese (Mn), iron, aluminum, vanadium (V) and titanium (Ti) as a transition metal element is especially preferable. A chemical formula thereof is represented by, for example, $Li_{x1}M1O_2$ or $Li_yM2PO_4$. In the formulae, each of M1 and M2 includes one kind or more kinds of a transition metal element; and values of x1 and y vary depending upon the charge and discharge state of the battery and are usually satisfied with the relationships of ($0.05 \leq x1 \leq 1.10$) and ($0.05 \leq y \leq 1.10$).

Specific examples of the complex oxide containing lithium and a transition metal element include a lithium cobalt complex oxide ($Li_{x1}CoO_2$), a lithium nickel complex oxide ($Li_{x1}NiO_2$), a lithium nickel cobalt complex oxide ($Li_{x1}Ni_{1-z}Co_zO_2$ ($z<1$)), a lithium nickel cobalt manganese complex oxide ($Li_{x1}Ni_{(1-v-w)}Co_vMn_wO_2$ (($v+w$)$<1$)) and a lithium manganese complex oxide having a spinel type structure ($LiMn_2O_4$).

As the positive electrode material capable of intercalating and deintercalating lithium, there are also exemplified other metal compound and a polymer material. Examples of other metal compound include oxides such as titanium oxide, vanadium oxide and manganese dioxide; and disulfides such as titanium sulfide and molybdenum sulfide. Examples of the polymer material include polyaniline and polythiophene.

It is constituted that the positive electrode active material has a specific surface area, as measured by the $N_2$ gas BET (Brunauer-Emmett-Teller) method, falling within the range of from 0.05 to 2.0 $m^2/g$, and preferably from 0.2 to 0.7 $m^2/g$. This is because a more effective film can be formed within this range.

The positive electrode active material layer 21B may contain a conductive material, if desired. Examples of the conductive material include carbon materials such as graphite, carbon black and ketjen black, and these materials are used singly or in admixture of two or more kinds thereof. Also, in addition to the carbon material, a metal material or a conductive polymer material or the like may be used so far as it is a material having conductivity.

The negative electrode 22 has, for example, a configuration in which a negative electrode active material layer 22B is provided on the both surfaces of a negative electrode collector 22A having a pair of surfaces opposing to each other. While illustration is omitted, the negative electrode active material layer 22B may be provided on only one surface of the negative electrode collector 22A. The negative electrode collector 22A is constituted of a metal foil, for example, a copper foil, a nickel foil, a stainless steel foil, etc.

Though the negative electrode active material layer 22B is preferably composed mainly of, as a negative electrode active material, a carbon based material capable of intercalating and deintercalating lithium as an electrode reactant, other negative electrode active material may be used jointly. Also, if desired, the negative electrode active material layer may contain, for example, the same conductive agent as in the positive electrode active material layer 21B.

The separator 23 isolates the positive electrode 21 and the negative electrode 22 from each other and allows a lithium ion to pass therethrough while preventing a short circuit of current to be caused due to contact of the both electrodes from occurring. The separator 23 is constituted of, for example, a porous membrane made of a synthetic resin such as polytetrafluoroethylene, polypropylene and polyethylene or a porous membrane made of a ceramic. The separator 23 may also have a porous membrane structure in which two or more kinds of these porous membranes are laminated. Above all, a polyolefin-made porous membrane is preferable because it is excellent in an effect for preventing a short circuit from occurring and is able to contrive to enhance the safety of the battery due to a shutdown effect. In particular, polyethylene is preferable as a material which constitutes the separator 23 because it is able to obtain a shutdown effect at from 100 to 160° C. and is excellent in electrochemical stability. Also, polypropylene is preferable. Besides, a resin may be used upon being copolymerized or blended with polyethylene or polypropylene so far as it is provided with chemical stability.

A nonaqueous electrolyte is impregnated in the separator 23.

This secondary battery can be, for example, manufactured in the following manner.

First of all, as to the positive electrode, for example, polyvinylidene fluoride is dispersed in a solvent such as N-methyl-2-pyrrolidone. Subsequently, this mixed solution is mixed with a positive electrode active material having an olivine structure and a conductive agent, thereby forming a positive electrode mixture slurry in a paste form. There is thus prepared a positive electrode mixture coating solution. Subsequently, this positive electrode mixture coating solution is coated on the positive electrode collector 21A, and the solvent is then dried. Thereafter, the resultant is compression molded by a roll press or the like to form the positive electrode active material layer 21B. There is thus prepared the positive electrode 21. The positive electrode active material layer 21B may also be formed by sticking the positive electrode mixture onto the positive electrode collector 21A.

Also, a carbon based material as a negative electrode active material and a binder are mixed to prepare a negative electrode mixture. This negative electrode mixture is dispersed in a solvent such as N-methyl-2-pyrrolidone to form a negative electrode mixture slurry in a paste form. There is thus prepared a negative electrode mixture coating solution. Subsequently, this negative electrode mixture coating solution is coated on the negative electrode collector 22A, and the solvent is then dried. Thereafter, the resultant is compression molded by a roll press or the like to form the negative electrode active material layer 22B. There is thus prepared the negative electrode 22. The negative electrode active material layer 22B may also be formed by sticking the negative electrode mixture onto the negative electrode collector 22A.

Subsequently, the positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded with the safety valve mechanism 15; and a tip end of the negative electrode lead 26 is welded with the battery can 11. The wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, an electrolytic solution containing a sulfone compound is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. There is thus completed the secondary battery shown in FIG. 1.

In this secondary battery, when charged, for example, a lithium ion is deintercalated from the positive electrode active material layer 21B and intercalated in the negative electrode active material layer 22B via the electrolytic solution. Also, when discharged, for example, a lithium ion is deintercalated from the negative electrode active material layer 22B and intercalated in the positive electrode active material layer 21B via the electrolytic solution.

Also, in the foregoing embodiment, the secondary battery of a cylinder type having a winding structure has been specifically described. However, the present application is similarly applicable to a secondary battery of an oval type or a polygonal type each having a winding structure, or a secondary battery having other shape in which a positive electrode and a negative electrode are folded, or plural positive electrodes and negative electrodes are laminated. In addition, the present application is similarly applicable to secondary batteries having other shape such as a coin type, a button type, a square type and a laminated film type.

Moreover, in the foregoing embodiment, the case of using an electrolytic solution in a liquid form as the nonaqueous electrolyte has been described. However, a nonaqueous electrolyte in a gel form in which an electrolytic solution is held in a holding body such as a polymer compound may be used. Examples of such a polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. In particular, polyacrylonitrile, polyvinylidene fluoride, polyhexafluoropropylene and polyethylene oxide are preferable in view of electrochemical stability. A proportion of the polymer compound to the electrolytic solution varies with compatibility therebetween. In general, it is preferable that the polymer compound is added in an amount corresponding to 5% by mass or more and not more than 50% by mass in the electrolytic solution.

EXAMPLES

Specific working examples of the present application are hereunder described in detail, but it should not be construed that the present application is limited thereto.

Examples 1-1 to 1-3 and Comparative Examples 1-1 to 1-3

The secondary battery of a cylinder type as shown in FIGS. 1 and 2 was prepared.

Lithium iron phosphate ($LiFePO_4$) having an accumulated 50% (on a volume basis) primary particle size (median particle size) obtained by the laser diffraction method of 200 nm was used as a positive electrode active material. Subsequently, as to a positive electrode, a mixed solution of 5.0% by mass (on a positive electrode mixture basis) of polyvinylidene fluoride dispersed in N-methyl-2-pyrrolidone was mixed with 92% by mass (on a positive electrode mixture basis) of the lithium iron phosphate powder and 3% by mass (on a positive electrode mixture basis) of ketjen black as a conductive material, thereby forming a positive electrode mixture coating solution. Here, the positive electrode mixture is the total sum of polyvinylidene fluoride, lithium iron phosphate and the conductive material.

Subsequently, this positive electrode mixture coating solution was uniformly coated on the both surfaces of the positive electrode collector 21A made of a strip-shaped aluminum foil having a thickness of 20 μm and then dried to vaporize the solvent for coating from the positive electrode mixture coating solution. Thereafter, the resultant was compression molded to form the positive electrode active material layer 21B on the positive electrode collector 21A, thereby preparing the positive electrode 21. On that occasion, a thickness of one surface of the positive electrode active material layer 21B was set up at 50 μm. Thereafter, the positive electrode lead 25 made of aluminum was installed in one end of the positive electrode collector 21A.

Also, 95% by mass (on a negative electrode mixture basis) of a granular graphite powder made of a mesophase spherical particle having a lattice spacing $d_{002}$ in the C-axis direction calculated in the X-ray diffraction of 0.336 nm and a median particle size of 15.6 μm as a negative electrode active material and 5.0% by mass (on a negative electrode mixture basis) of polyvinylidene fluoride as a binder were mixed, and the mixture was dispersed in N-methyl-2-pyrrolidone as a solvent to prepare a negative electrode mixture coating solution. Here, the negative electrode mixture is the total sum of the graphite powder and polyvinylidene fluoride.

Subsequently, this negative electrode mixture coating solution was uniformly coated on the both surfaces of the negative electrode collector 22A made of a strip-shaped copper foil having a thickness of 15 μm and then dried. The resultant was compression molded to form the negative electrode active material layer 22B, thereby preparing the negative electrode 22. On that occasion, a thickness of one surface of the negative electrode active material layer 22B was set up at 52 μm. Subsequently, the negative electrode lead 26 made of nickel was installed in three areas in one end of the negative electrode collector 22A.

After preparing the positive electrode 21 and the negative electrode 22, respectively, the positive electrode 21 and the negative electrode 22 were laminated via the separator 23 made of a microporous polyethylene stretched film having a thickness of 18 μm in the order of the negative electrode 22, the separator 23, the positive electrode 21 and the separator 23. The resulting laminate was wound many times, thereby preparing the wound electrode body 20 of a jelly roll type. Subsequently, the wound electrode body 20 was interposed between a pair of the insulating plates 12 and 13; not only the negative electrode lead 26 was welded with the battery can 11, but the positive electrode lead 25 was welded with the safety valve mechanism 15; and the wound electrode body 20 was then housed in the inside of the battery can 11. Subsequently, an electrolytic solution was injected into the inside of the battery can 11, and the battery lid 14 was caulked with the battery can 11 via the gasket 17, thereby preparing a secondary battery of a cylinder type.

A solution prepared by dissolving, as an electrolyte salt, lithium hexafluorophosphate in a proportion of 1.28 moles/kg in a mixed solvent of ethylene carbonate (EC), dimethyl carbonate (DMC) and propylene carbonate (PC) in a proportion of 20/70/10 (by mass) was used as the electrolytic salt. On that occasion, a sulfone compound was added as the additive. In Examples 1-1 to 1-3 and Comparative Examples 1-2 to 1-3, the sulfone compound was changed to Compounds 1 to 5, respectively. In Comparative Example 1-1, the sulfone compound was not used.

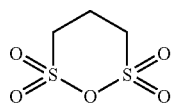

Compound 1

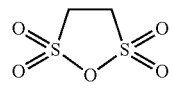

Compound 2

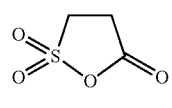

Compound 3

Compound 4

CH$_3$SO$_3$C$_4$H$_9$: Butyl methanesulfonate

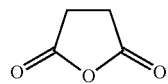

Compound 5

(Measurement of Capacity Retention Rate)

Each of the thus prepared lithium ion secondary batteries of Examples 1-1 to 1-3 and Comparative Examples 1-1 to 1-3 was subjected to a floating test at 60° C. and examined with respect to a capacity retention rate after a lapse of 3,000 hours. First of all, the charge was performed at a constant current of 1 C until a battery voltage reached 3.65 V and then performed at a constant voltage of 3.65 V, thereby making it in a floated state. Each of the battery after a lapse of one hour and the battery after a lapse of 3,000 hours was discharged at a constant current of 1 C; the discharge was completed at the point of time when the battery voltage reached 3.0 V; and a discharge capacity was measured. A capacity retention rate after a lapse of 3,000 hours was determined according to an expression of [{(battery capacity after a lapse of 3,000 hours)/(battery capacity after a lapse of one hour)}×100].

TABLE 1

|  | Positive electrode active material Kind | Solvent Kind | Sulfone compound or the like | | Floating at 60° C./ Capacity retention rate after a lapse of 3,000 hours (%) |
|---|---|---|---|---|---|
|  |  |  | Kind | % by mass |  |
| Example 1-1 | LiFePO$_4$ | EC/DMC/PC (20/70/10) | Compound 1 | 0.5 | 94 |
| Example 1-2 | LiFePO$_4$ | EC/DMC/PC (20/70/10) | Compound 2 | 0.5 | 91 |
| Example 1-3 | LiFePO$_4$ | EC/DMC/PC (20/70/10) | Compound 3 | 0.5 | 89 |
| Comparative Example 1-1 | LiFePO$_4$ | EC/DMC/PC (20/70/10) | — | — | 68 |
| Comparative Example 1-2 | LiFePO$_4$ | EC/DMC/PC (20/70/10) | Compound 4 | 0.5 | 69 |
| Comparative Example 1-3 | LiFePO$_4$ | EC/DMC/PC (20/70/10) | Compound 5 | 0.5 | 66 |

As shown in Table 1, in Examples 1-1 to 1-3, the capacity retention rate could be conspicuously enhanced as compared with that in Comparative Example 1-1 in which the sulfone compound was not added. Also, it was noted that in particular, the structure of Compound 1 could reveal the effect. Also, in Comparative Example 1-2 in which a chain compound was used in place of the sulfone compound according to the embodiment of the present application, the effect for enhancing a capacity retention rate was not obtained, and therefore, it was noted that excellent characteristics are obtained by using a cyclic structure. Also, in Comparative Example 1-3 in which even a cyclic anhydride having a carboxylic structure was used, the effect for enhancing a capacity retention rate was not obtained, and therefore, it was noted that excellent characteristics are obtained by using a cyclic sulfonic acid anhydride structure.

Examples 2-1 to 2-6

In Examples 2-1 to 2-6, cylindrical secondary batteries were prepared in the same manner as in Example 1-1, except for changing the addition amount of the sulfone compound (Compound 1).

TABLE 2

| Positive electrode active material Kind | Solvent Kind | Sulfone compound or the like | | Floating at 60° C./ Capacity retention rate after a lapse of 3,000 hours (%) |
|---|---|---|---|---|
| | | Kind | % by mass | |
| Example 2-1 | LiFePO$_4$ | EC/DMC/PC (20/70/10) | Compound 1 | 0.005 | 72 |
| Example 2-2 | LiFePO$_4$ | EC/DMC/PC (20/70/10) | Compound 1 | 0.01 | 78 |
| Example 2-3 | LiFePO$_4$ | EC/DMC/PC (20/70/10) | Compound 1 | 0.1 | 92 |
| Example 1-1 | LiFePO$_4$ | EC/DMC/PC (20/70/10) | Compound 1 | 0.5 | 94 |
| Example 2-4 | LiFePO$_4$ | EC/DMC/PC (20/70/10) | Compound 1 | 0.8 | 89 |
| Example 2-5 | LiFePO$_4$ | EC/DMC/PC (20/70/10) | Compound 1 | 1.0 | 80 |
| Example 2-6 | LiFePO$_4$ | EC/DMC/PC (20/70/10) | Compound 1 | 1.5 | 73 |
| Comparative Example 1-1 | LiFePO$_4$ | EC/DMC/PC (20/70/10) | — | — | 68 |

In Examples 2-1 to 2-6, a favorable enhancement of the capacity retention rate could be confirmed by the addition of a sulfone compound. When the addition amount of the sulfone compound is too low, an effect for sufficiently forming a film on the surface of the positive electrode is a little; whereas when it is too high, the film on the surface of the positive electrode is too thick, and therefore, influences by a lowering of the capacity retention rate due to an increase of the interfacial resistance are larger than those by a lowering of the capacity retention rate due to elution of iron. According to this, it was noted that an optimum addition amount of the sulfone compound falls within the range of from 0.01% by mass to 1.0% by mass.

Examples 3-1 to 3-3 and Comparative Examples 3-1 to 3-3

Cylindrical secondary batteries were prepared in the same manner as in Example 1-1, except for changing the kind of the positive electrode active material.

From the results shown in Table 3, it was noted that even in batteries using an exotic metal-containing lithium iron complex phosphate compound (LiFe$_x$M$_{1-x}$PO$_4$, wherein M represents a metal of one or more kinds), the effects due to the addition of a sulfone compound were revealed.

Examples 4-1 to 4-2 and Comparative Examples 4-1 to 4-2

Cylindrical secondary batteries were prepared in the same manner as in Example 1-1, except for changing the kind of the solvent of the electrolytic solution.

TABLE 3

| Positive electrode active material Kind | Solvent Kind | Sulfone compound or the like | | Floating at 60° C./ Capacity retention rate after a lapse of 3,000 hours (%) |
|---|---|---|---|---|
| | | Kind | % by mass | |
| Example 1-1 | LiFePO$_4$ | EC/DMC/PC (20/70/10) | Compound 1 | 0.5 | 94 |
| Example 3-1 | LiFe$_{0.75}$Co$_{0.25}$PO$_4$ | EC/DMC/PC (20/70/10) | Compound 1 | 0.5 | 93 |
| Example 3-2 | LiFe$_{0.75}$Ni$_{0.25}$PO$_4$ | EC/DMC/PC (20/70/10) | Compound 1 | 0.5 | 93 |
| Example 3-3 | LiFe$_{0.75}$Mn$_{0.25}$PO$_4$ | EC/DMC/PC (20/70/10) | Compound 1 | 0.5 | 95 |
| Comparative Example 1-1 | LiFePO$_4$ | EC/DMC/PC (20/70/10) | — | — | 68 |
| Comparative Example 3-1 | LiFe$_{0.75}$Co$_{0.25}$PO$_4$ | EC/DMC/PC (20/70/10) | — | — | 65 |
| Comparative Example 3-2 | LiFe$_{0.75}$Ni$_{0.25}$PO$_4$ | EC/DMC/PC (20/70/10) | — | — | 67 |
| Comparative Example 3-3 | LiFe$_{0.75}$Mn$_{0.25}$PO$_4$ | EC/DMC/PC (20/70/10) | — | — | 69 |

TABLE 4

| | Positive electrode active material Kind | Solvent Kind | Sulfone compound or the like | | Floating at 60° C./ Capacity retention rate after a lapse of 3,000 hours (%) |
|---|---|---|---|---|---|
| | | | Kind | % by mass | |
| Example 1-1 | LiFePO$_4$ | EC/DMC/PC (20/70/10) | Compound 1 | 0.5 | 94 |
| Example 4-1 | LiFePO$_4$ | EC/DMC/PC/FEC (20/60/10/10) | Compound 1 | 0.5 | 96 |
| Example 4-2 | LiFePO$_4$ | EC/DMC/PC/FEC/VC (20/60/10/9/1) | Compound 1 | 0.5 | 96 |
| Comparative Example 1-1 | LiFePO$_4$ | EC/DMC/PC (20/70/10) | — | — | 68 |
| Comparative Example 4-1 | LiFePO$_4$ | EC/DMC/PC/FEC (20/60/10/10) | — | — | 69 |
| Comparative Example 4-2 | LiFePO$_4$ | EC/DMC/PC/FEC/VC (20/60/10/9/1) | — | — | 69 |

From the results shown in Table 4, even by using any of the foregoing electrolytic solutions, an enhancement of the capacity retention rate could be confirmed by the addition of a sulfone compound.

Comparative Examples 5-1 to 5-4

The kind of the negative electrode active material was changed. In Comparative Examples 5-1 and 5-3 to 5-4, a tin-containing negative electrode active material was synthesized as a first constitutional element while utilizing a mechanochemical reaction. A composition of the obtained negative electrode active material powder was analyzed. The content of carbon was measured by a carbon/sulfur analyzer, and the content of each of other elements was measured by means of ICP (inductively coupled plasma) emission spectrometry. The obtained results are shown in parentheses in the negative electrode active material column of the following Table 5. The numerals shown upon being punctuated with a slash within the parenthesis respectively express the contents (% by mass) of the foregoing elements in order. Subsequently, 80 parts by mass of the obtained negative electrode active material powder, 11 parts by mass of graphite (KS-15, manufactured by Lonza) and 1 part by mass of acetylene black as a conductive material and 8 parts by mass of polyvinylidene fluoride as a binder were mixed, and the mixture was dispersed in N-methyl-2-pyrrolidone as a solvent, thereby forming a negative electrode mixture slurry. Subsequently, this negative electrode mixture slurry was uniformly coated on the both surfaces of the negative electrode collector 22A made of a strip-shaped copper foil having a thickness of 10 μm and then dried. The resultant was compression molded under a fixed pressure to form the negative electrode active material layer 22B. There was thus prepared the negative electrode 22. Thereafter, the negative electrode lead 26 made of nickel was installed in one end of the negative electrode collector 22A.

Also, in Comparative Example 5-2, the negative electrode active material layer 22B made of silicon was formed on the negative electrode collector 22A by means of vapor deposition with electron beams and then subjected to a heating treatment, thereby preparing the negative electrode 22. Cylindrical secondary batteries were prepared in the same manner as in Example 1-1 and Comparative Example 1-1, except for changing the kind of the negative electrode active material.

TABLE 5

| | Positive electrode active material Kind | Solvent Kind | Negative electrode active material Kind | Sulfone compound | | Floating at 60° C./ Capacity retention rate after a lapse of 3,000 hours (%) |
|---|---|---|---|---|---|---|
| | | | | Kind | % by mass | |
| Example 1-1 | LiFePO$_4$ | EC/DMC/PC (20/70/10) | Graphite | Compound 1 | 0.5 | 94 |
| Comparative Example 1-1 | LiFePO$_4$ | EC/DMC/PC (20/70/10) | Graphite | — | — | 68 |
| Comparative Example 5-1 | LiFePO$_4$ | EC/DMC/PC (20/70/10) | Sn—Co—C (50/29.4/19.6) | Compound 1 | 0.5 | 77 |
| Comparative Example 5-2 | LiFePO$_4$ | EC/DMC/PC (20/70/10) | Si | Compound 1 | 0.5 | 74 |
| Comparative Example 5-3 | LiFePO$_4$ | EC/DMC/PC (20/70/10) | Sn—Co—C (50/29.4/19.6) | — | — | 78 |
| Comparative Example 5-4 | LiFePO$_4$ | EC/DMC/PC (20/70/10) | Si | — | — | 72 |

As is clear from the results shown in Table 5, when an active material having an extremely strong activity against the electrolytic solution, such as an Sn based material and an Si based material, is used for the negative electrode, decomposition of the electrolytic solution is vigorous, and a lowering in the floating characteristic is vigorous regardless of the deterioration on the positive electrode side. Even when a sulfone compound is used, the deterioration to be caused due to elution of iron on the positive electrode side can be suppressed; however, the decomposition of the electrolytic solution on the negative electrode side cannot be suppressed, the film on the surface of the negative electrode becomes thick, and the deterioration of the capacity to be caused due to an increase in the resistance cannot be suppressed. It was noted from this fact that the sulfone compound reveals the effects against a battery composed of a combination of a carbon based negative electrode and a positive electrode containing a positive electrode active material having an olivine structure.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte secondary battery comprising:
a positive electrode;
a negative electrode; and
a nonaqueous electrolyte, wherein:
the positive electrode contains a positive electrode active material selected from the group consisting of: a lithium iron phosphate compound (LiFePO$_4$), and an exotic atom-containing lithium iron complex phosphate compound having a formula LiFe$_x$M$_{1-x}$PO$_4$, wherein M represents at least one metal selected from the group consisting of: cobalt, nickel, manganese, iron, aluminum, vanadium and titanium; and $0<x<1$,
the nonaqueous electrolyte contains at least one member of sulfone compounds selected from the group consisting of the following Compounds 1 to 3:

Compound 1

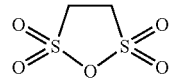

Compound 2

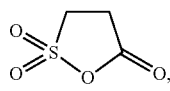

Compound 3

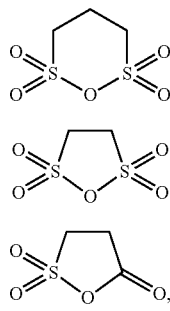

the negative electrode contains a negative electrode active material composed mainly of carbon, and
a content of the sulfone compound in the nonaqueous electrolyte ranges from 0.1 to 0.8% by mass relative to the nonaqueous electrolyte.

2. The nonaqueous electrolyte secondary battery according to claim 1, wherein the at least one member of sulfone compounds is Compound 1.

3. The nonaqueous electrolyte secondary battery according to claim 1, wherein a surface of the positive electrode active material is coated with a coating layer containing a coating compound selected from the group consisting of: a metal oxide and a phosphate compound, the coating compound having a different composition from the positive electrode active material.

4. A nonaqueous electrolyte secondary battery comprising:
a positive electrode;
a negative electrode; and
a nonaqueous electrolyte, wherein:
the positive electrode contains a positive electrode active material selected from the group consisting of: a lithium iron phosphate compound (LiFePO$_4$) and an exotic atom-containing lithium iron complex phosphate compound having a formula LiFe$_x$M$_{1-x}$PO$_4$, wherein M represents at least one metal selected from the group consisting of: cobalt, nickel, manganese, iron, aluminum, vanadium and titanium; and $0<x<1$,
the nonaqueous electrolyte contains at least one member of sulfone compounds represented by the following formula (1):

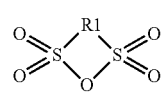

(1)

wherein R1 represents $C_mH_{2m-n1}X_{n2}$; X represents a halogen; m represents an integer of from 2 to 7; and each of n1 and n2 independently represents an integer of from 0 to 2m, and
the negative electrode contains a negative electrode active material composed mainly of carbon.

* * * * *